(12) United States Patent
Wang

(10) Patent No.: US 11,577,303 B2
(45) Date of Patent: Feb. 14, 2023

(54) MANUFACTURING METHOD OF A CUTTING MEMBER

(71) Applicants: HANGZHOU GREAT STAR INDUSTRIAL CO., LTD., Hangzhou (CN); HANGZHOU GREAT STAR TOOLS CO., LTD., Hangzhou (CN)

(72) Inventor: Weiyi Wang, Hangzhou (CN)

(73) Assignees: Hangzhou Great Star Industrial Co., Ltd., Hangzhou (CN); Hangzhou Great Star Tools Co., Ltd., Hangzhou (CN)

(*) Notice: Subject to any disclaimer, the term of this patent is extended or adjusted under 35 U.S.C. 154(b) by 497 days.

(21) Appl. No.: 16/320,634

(22) PCT Filed: Jul. 28, 2016

(86) PCT No.: PCT/CN2016/092092
§ 371 (c)(1),
(2) Date: Jan. 25, 2019

(87) PCT Pub. No.: WO2018/018506
PCT Pub. Date: Feb. 1, 2018

(65) Prior Publication Data
US 2019/0160521 A1 May 30, 2019

(51) Int. Cl.
*B21K 11/02* (2006.01)
*B23P 23/04* (2006.01)
(Continued)

(52) U.S. Cl.
CPC .............. *B21K 11/02* (2013.01); *B21K 11/00* (2013.01); *B23K 26/34* (2013.01); *B23K 31/025* (2013.01);
(Continued)

(58) Field of Classification Search
CPC ...... B21K 11/02; B21K 11/00; B23K 26/323; B23K 15/0006; B23K 26/34;
(Continued)

(56) References Cited

U.S. PATENT DOCUMENTS 4,336,083 A * 6/1982 Dempsey ................. C21D 9/18
148/524
4,689,919 A * 9/1987 Kawakita ............... B23D 65/00
451/547
(Continued)

FOREIGN PATENT DOCUMENTS

CN 1549759 A 11/2004
CN 1777492 A 5/2006
(Continued)

OTHER PUBLICATIONS

Machine English Translation of JP-H-0259211-A (Year: 1990).*
(Continued)

*Primary Examiner* — Sang Y Paik
*Assistant Examiner* — Erwin J Wunderlich
(74) *Attorney, Agent, or Firm* — Blank Rome LLP

(57) ABSTRACT

A method of manufacturing a cutting member include cutting a first metal material to form a first portion of the cutting member; cutting second metal material to form a second portion of the cutting member, wherein a first edge of the second portion has at least two line segments, a curve formed by the at least two line segments being mathematically continuously differentiable; welding the first portion and the second portion together; raising the cutting member blank to a first temperature at a first rate and holding raising the cutting member blank from the first temperature to a second temperature at a second rate lower than the first rate and holding, and raising the cutting member blank from the
(Continued)

second temperature to a third temperature at a third rate not higher than the second rate and holding.

8 Claims, 3 Drawing Sheets

(51) Int. Cl.
| | |
|---|---|
| *B23K 31/02* | (2006.01) |
| *C21D 9/18* | (2006.01) |
| *C22C 38/00* | (2006.01) |
| *C21D 9/50* | (2006.01) |
| *B21K 11/00* | (2006.01) |
| *C21D 1/06* | (2006.01) |
| *C21D 1/18* | (2006.01) |
| *B23K 26/34* | (2014.01) |
| *B23K 26/00* | (2014.01) |
| *B26B 9/00* | (2006.01) |
| *C21D 1/25* | (2006.01) |
| *C22C 38/24* | (2006.01) |
| *C22C 38/30* | (2006.01) |

(52) U.S. Cl.
CPC .............. *B23P 23/04* (2013.01); *B26B 9/00* (2013.01); *C21D 1/06* (2013.01); *C21D 1/18* (2013.01); *C21D 1/25* (2013.01); *C21D 9/18* (2013.01); *C21D 9/50* (2013.01); *C22C 38/00* (2013.01); *B23K 26/0093* (2013.01); *C21D 2211/005* (2013.01); *C21D 2211/008* (2013.01); *C22C 38/24* (2013.01); *C22C 38/30* (2013.01)

(58) Field of Classification Search
CPC .. B23K 31/025; B23K 26/0093; B23K 26/32; B23K 26/322; B23K 26/28; B23K 26/30; B23K 15/0053; B23K 15/0093; B23K 28/00; B23P 15/40; B23P 23/04; B26B 9/00; C21D 1/25; C21D 9/18; C21D 9/50; C21D 2211/004; C21D 1/56; C21D 1/58; C21D 1/60; C21D 1/607; C21D 1/613; C21D 1/74; C21D 1/767; C21D 1/773; C21D 6/00; C21D 6/001; C21D 6/021; C21D 6/004; C21D 6/005; C21D 6/007; C21D 6/008; C21D 6/04; C21D 9/22; C21D 9/24; C21D 9/021; C21D 9/505; C21D 6/002; C21D 2211/005; C21D 2211/008; C21D 2251/04; C21D 1/06; C21D 1/18; C21D 6/02; C21D 9/20; C22C 38/00; C22C 38/02; C22C 38/04; C22C 38/22; C22C 38/24; C22C 38/30
USPC ....................................... 219/121.6
See application file for complete search history.

(56) References Cited

U.S. PATENT DOCUMENTS

| 4,896,424 | A | 1/1990 | Walker | |
|---|---|---|---|---|
| 6,701,627 | B2 | 3/2004 | Korb et al. | |
| 7,658,129 | B2 | 2/2010 | Korb et al. | |
| 7,712,222 | B2* | 5/2010 | Korb | B21D 53/64 |
| | | | | 30/346.54 |
| 8,096,221 | B2* | 1/2012 | Tarrerias | B26B 9/00 |
| | | | | 83/835 |
| 8,291,602 | B2 | 10/2012 | Korb et al. | |
| 9,126,259 | B2* | 9/2015 | Korb | B21D 53/64 |
| 9,393,984 | B2* | 7/2016 | Culf | B23P 15/40 |
| 10,029,050 | B2 | 7/2018 | Phan | |
| 2003/0019111 | A1 | 1/2003 | Korb et al. | |
| 2003/0019332 | A1 | 1/2003 | Korb et al. | |
| 2004/0168326 | A1 | 9/2004 | Korb et al. | |
| 2004/0187314 | A1* | 9/2004 | Johnson | B26B 9/02 |
| | | | | 30/162 |
| 2004/0244539 | A1 | 12/2004 | Korb et al. | |
| 2008/0250656 | A1 | 10/2008 | Lewis | |
| 2010/0263491 | A1 | 10/2010 | Korb et al. | |
| 2013/0081283 | A1* | 4/2013 | Lewis | B26B 9/00 |
| | | | | 30/350 |
| 2013/0233145 | A1* | 9/2013 | Sotelo | B21K 11/00 |
| | | | | 83/835 |
| 2019/0226043 | A1* | 7/2019 | Chien | C21D 9/18 |

FOREIGN PATENT DOCUMENTS

| CN | 101318333 A | 12/2008 | |
|---|---|---|---|
| CN | 101838727 A | 9/2010 | |
| CN | 102114596 A | 7/2011 | |
| CN | 101838727 B * | 11/2012 | |
| CN | 103469125 A * | 12/2013 | |
| CN | 104908079 A * | 9/2015 | |
| CN | 105014318 B * | 4/2016 | |
| JP | 1990059211 | 2/1990 | |
| JP | H-0259211 A * | 2/1990 | |
| JP | 1990065891 A | 3/1990 | |
| JP | 2004535892 A | 12/2004 | |
| JP | 2006181350 A | 7/2006 | |
| JP | 2008259857 A | 10/2008 | |
| WO | 03009978 A1 | 2/2003 | |
| WO | 2004078424 A2 | 9/2004 | |
| WO | WO-2004078424 A2 * | 9/2004 | B26B 9/00 |

OTHER PUBLICATIONS

Machine English Translation of CN-101838727-B (Year: 2012).*
Machine English Translation of CN-103469125-A (Year: 2013).*
Machine English Translation of CN-104908079-A (Year: 2015).*
Machine English Translation of CN-105014318-B (Year: 2016).*
International Search Report issued in International Application No. PCT/CN2016/092092 dated May 3, 2017, with English Translation.
Dr. Rüdiger Paschotta, "Encyclopedia of Laser Physics and Technology", dated Aug. 31, 2008, 7 pages, cited in related European Patent Application 16910087.2 mailed Jun. 24, 2020.

* cited by examiner

MANUFACTURING METHOD OF A CUTTING MEMBER

CROSS-REFERENCE TO RELATED APPLICATIONS

This application is a National Stage of PCT/CN2016/092092, filed Jul. 28, 2016, which is incorporated herein by reference in its entirety for all purposes.

FIELD OF THE INVENTION

The present invention relates to a cutting member, and in particular, to a cutting member formed by welding of metal material in which the support portion has high toughness and the cutting edge portion has high hardness and high abrasion resistance. The present invention also relates to a method of manufacturing such cutting member.

DESCRIPTION OF THE PRIOR ART

Cutting member is used for cutting an object, and generally may include various forms such as blade and saw blade, and generally includes a support portion and a cutting edge portion, the support portion plays a role of supporting the cutting edge portion, and the cutting edge portion can be used for cutting. Take the example of the blade, the support portion thereof is a body, and the cutting edge portion thereof is a cutting edge. Conventional blades are generally made of a single material, for example, a finished blade is formed by blanking and grinding of multiple bulk materials. The body and cutting edge of such blade has consistent toughness and hardness or abrasion resistance. If it is desired to improve the hardness of the cutting edge of the blade to make the service life of the cutting edge longer, it needs to use a material with high hardness. But the body made of the material with high hardness has poor toughness, so it is easily broken during the use of the blade. If a material with good toughness is used to improve the toughness of the body, the hardness of the cutting edge made of the material is deteriorated so that the abrasion resistance of the cutting edge is reduced and the service life thereof is shortened. If the manufacturing material chosen has an intermediate performance between high hardness and high toughness, only a balance between toughness of the body and hardness of the cutting edge can be obtained, but both of the toughness of the body and hardness of the cutting edge do not achieve the best effects. Other cutting members also have similar drawbacks to the blade.

Accordingly, those skilled in the art have endeavored to develop a cutting member which possesses high toughness of a support portion and high hardness/high abrasion resistance of a cutting edge portion and has a long service life, and a method of manufacturing such cutting member.

SUMMARY OF THE INVENTION

In view of the above-mentioned drawbacks of the prior art, the technical problem to be solved by the present invention is to provide a cutting member which possesses high toughness of a support portion and high hardness/high abrasion resistance of a cutting edge portion and has a long service life, and a method of manufacturing the same.

To achieve the above objects, an aspect of the present invention provides a method of manufacturing a cutting member:

the cutting member has a first portion for supporting, a second portion for forming a cutting edge, and a third portion connecting the first portion and the second portion;

the manufacturing method includes:

providing a first metal material which is used for forming the first portion and has a first side; providing a second metal material which is used for forming the second portion and has a second side;

welding the first side of the first metal material and the second side of the second metal material with high energy density beam, and the above-described third portion is formed at the welding site; and obtaining a cutting member blank after welding, and performing heat treatment on the cutting member blank.

Further, the above-described high energy density beam welding is laser, electron beam or ion beam welding.

Further, the high energy density beam welding is pulse laser welding, and the wavelength of the laser light is 1064 nm.

Alternatively, the high energy density beam welding is continuous laser welding, the continuous laser light is generated by a rare-earth doped laser, and the wavelength of the laser light is 1070 nm±10 nm.

Further, the moving rate of the laser light is 5~50 mm/s.

Further, the first metal material is hardened stainless steel; and the second metal material is tool steel.

Further, the first metal material is martensitic stainless steel having a carbon content of 0.1~0.7%; and the second metal material is high-speed tool steel having a carbon content of not less than 0.7% or alloy tool steel having a carbon content of not less than 0.8%.

Preferably, the high-speed tool steel having a carbon content of not less than 0.7% or the alloy tool steel having a carbon content of not less than 0.8% contains at least one or more of alloy elements such as W, Cr, Mo, V and Co.

Further, the above-described manufacturing method further includes the following step before welding: cutting the first metal material and the second metal material, and the minimum width of the second metal material perpendicular to the first side is 0.3 mm.

Preferably, the above-described cutting is performed using wire cutting or high-speed punch press.

Preferably, the above-described manufacturing method further includes the following step after the heat treatment of the cutting member blank: grinding the first portion and the second portion of the cutting member blank after the heat treatment to form the shape of a finished cutting member.

A specific implementation of the present invention also provides a method of manufacturing a cutting member, the cutting member has a first portion for supporting, a second portion for forming a cutting edge, and a third portion connecting the first portion and the second portion;

the manufacturing method includes:

providing a first metal material which is used for forming the first portion and has a first side; providing a second metal material which is used for forming the second portion and has a second side; the first metal material is martensitic stainless steel having a carbon content of 0.1~0.7%; and the second metal material is high-speed tool steel having a carbon content of not less than 0.7% or alloy tool steel having a carbon content of not less than 0.8%;

welding the first side of the first metal material and the second side of the second metal material with high energy density beam, and the third portion is formed at the welding site; and obtaining a cutting member blank after welding, and performing heat treatment on the cutting member blank, the heat treatment includes:

raising and holding the temperature of the above-described cutting member blank in stages;

quenching the cutting member blank after temperature raising; and tempering the cutting member several times after quenching.

Further, the above-mentioned heat treatments are all performed under vacuum before the quenching, and the degree of vacuum in a vacuum heating chamber is not more than 200 Pa.

Further, the above-described step of raising and holding the temperature in stages includes:

raising the cutting member blank to a first temperature at a first rate and performing a first temperature holding;

raising the cutting member blank from the first temperature to a second temperature at a second rate lower than the first rate and performing a second temperature holding; and raising the cutting member blank from the second temperature to a third temperature at a third rate not higher than the second rate and performing a third temperature holding.

Further, the first rate is 9.5±1° C./min, the first temperature is 620~680° C., and the first temperature holding is holding the temperature for 60~90 min; the second rate is 7±0.5° C./min, the second temperature is 800~850° C., and the second temperature holding is holding the temperature for 60~90 min; and the third rate is 6±0.5° C./min, the third temperature is 1100~1250° C., and the third temperature holding is holding the temperature for 60~120 min.

Preferably, the first rate is 9.5° C./min, the first temperature is 650° C., and the first temperature holding is holding the temperature for 90 min; the second rate is 7° C./min, the second temperature is 800~850° C., and the second temperature holding is holding the temperature for 60~90 min; and the third rate is 6° C./min, the third temperature is 1100~1250° C., and the third temperature holding is holding the temperature for 60~120 min.

Further, the quenching is vacuum gas quenching, the pressure of the inert gas in the heating chamber is at least 0.5 bar, and the temperature in the heating chamber is reduced to below 100° C.

Alternatively, the quenching is vacuum oil quenching, and the temperature of the vacuum quenching oil used is in the range of 50~80° C.

Further, the second metal material adopts high-speed tool steel having a carbon content of not less than 0.7%, the step of tempering includes:

raising the cutting member blank after quenching to a fourth temperature and performing a fourth temperature holding.

Preferably, the fourth temperature is 500~560° C., the fourth temperature holding is holding the temperature for 2 hours, the tempering is performed three times, and the cutting member blank is air-cooled to a room temperature before every tempering and then raised to the fourth temperature.

Alternatively, the second metal material adopts alloy tool steel having a carbon content of not less than 0.8%, and the step of tempering includes:

raising the cutting member blank after quenching to a fifth temperature and performing a fifth temperature holding.

Further alternatively, the fifth temperature is 180~260° C., the fifth temperature holding is holding the temperature for 2 hours, the tempering is performed twice, and the cutting member blank is air-cooled to a room temperature before every tempering and then raised to the fifth temperature.

Another aspect of the present invention also provides a cutting member having a first portion for supporting, a second portion for forming a cutting edge, and a third portion connecting the first portion and the second portion;

the first portion is comprised of a first metal material, and the first metal material is hardened stainless steel and has a first side;

the second portion is comprised of a second metal material, the second metal material is tool steel and has a second side; and the third portion is formed by welding the first side of the first metal material and the second side of the second metal material with high energy density beam;

after welding, the metallographic structure of the first portion near the third portion, the metallographic structure of the third portion, and the metallographic structure of the second portion near the third portion are substantially free of holes.

Further, the metallographic structure of the first portion near the third portion contains martensite, ferrite and carbide structures, and the metallographic structure of the second portion near the third portion contains cryptocrystalline martensite and partial carbide structures.

Further, the metallographic structure of the first portion near the third portion makes the tensile strength thereat not lower than the tensile strength of the first metal material; and the metallographic structure of the second portion near the third portion makes the tensile strength thereat not lower than the tensile strength of the second metal material.

Further, heat treatment is performed on the cutting member to improve the hardness, the hardness of the first portion after heat treatment is between 36-54 HRC and the hardness of the second portion is between 58-72 RHC.

Further, the second portion has a first edge for cutting, and the first edge is smooth or sawtooth-shaped.

Further, the cutting member has a polygonal shape.

Further, the cutting member is triangular in shape and has a second edge and a third edge intersecting both ends of the first edge, respectively, and the second edge and the third edge also intersect with each other; the first portion and the second portion extend from the second edge to the third edge.

Further, the second edge consists of at least two line segments, including at least a continuous curve.

Further, the above-described at least two line segments are mathematically continuously differentiable.

Preferably, the ratio of the maximum width of the second portion to the maximum width of the first portion is 1:15~1:3.

A further aspect of the present invention provides a cutting tool including the cutting member manufactured according to the above-described manufacturing method or including the cutting member as described above.

Further, the above-described cutting tool is a fruit knife, a kitchen knife, a utility knife, a folding knife, an art knife, a single knife, a hand saw, a wallboard saw or a sweep saw.

The cutting member of the present invention possesses the characteristics that the support portion (the first portion) has high toughness and the cutting edge portion (the second portion) has high hardness. With the two kinds of metal materials and the welding method in the present invention, the metallographic structure of the third portion obtained, i.e., the weld is substantially free of holes, which indicates that the welding connection effect is good and the strength at the weld is high and it is not easily broken. The metallographic structures of the support portion and the cutting edge portion at both sides of the weld are also substantially free of holes, and the metallographic structure of the support portion near the weld after welding contains martensite, ferrite and carbide structures, which improves the tensile strength thereat so that it is at least not lower than the original tensile strength of the first metal material used in the support portion. The metallographic structure of the cutting edge portion near the weld after welding contains cryptocrystalline martensite and partial carbide structures, which improves the tensile strength thereat so that it is at least not lower than the original tensile strength of the second metal material used in the cutting edge portion.

Accordingly, the metal materials used in the present invention and the structure of the weld and its nearby structure produced with the welding process in the present invention overcome the weak characteristics of the weld produced with conventional metal materials using conventional welding process parameters, such that the entire connection between the cutting edge portion and the support portion is good, and the connection is no longer the weak part of the entire cutting member, so that the cutting member has a better service life.

During temperature raising of the heat treatment, temperature raising and holding in stages is used, the higher the temperature, the slower the temperature raising rate is, it can effectively prevent the cutting member from being cracked during this processing in combination with the specific process parameters of the present invention.

The triangular configuration and the mathematically continuously differentiability of the cutting edge curve (i.e., the first edge) in a specific implementation of the present invention make the cutting effect of the cutting member better.

The finished product of the cutting member obtained by the metal material composition and the process method of the present invention has a body with a hardness of 36-54 HRC and a cutting edge with a hardness of 58-72 RHC, which possesses high toughness of the support portion and high hardness/high abrasion resistance of the cutting edge portion, and has the durability of more than 300 mm, greatly improving the service life of the cutting member.

The concepts, the specific structures and the technical effects of the present invention will be described further below in conjunction with the accompanying drawings, in order to fully understand the objects, features and effects of the present invention.

DETAILED DESCRIPTION OF THE PREFERRED EMBODIMENTS

The cutting member according to the present invention is used for cutting an object, including a support portion, a cutting edge portion and a weld, the support portion plays a role of supporting the cutting edge portion, the cutting edge portion may be used for cutting, and the weld is formed by welding for connecting the support portion and the cutting edge portion.

Figure 1:
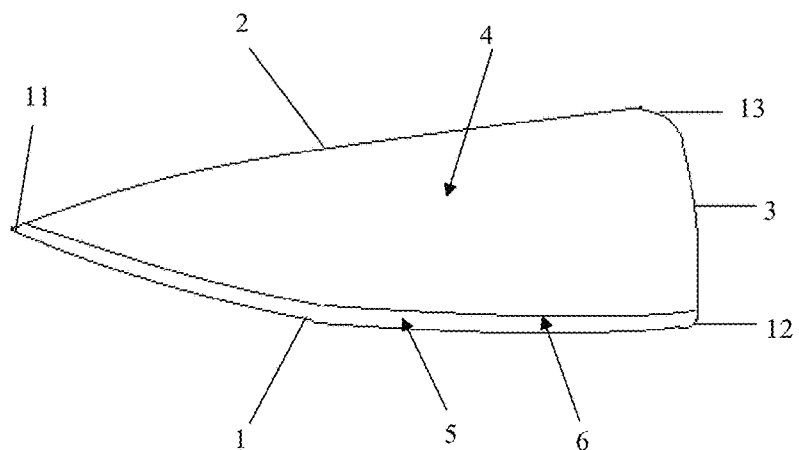
FIG. 1 is a schematic view of a preferred embodiment of a cutting member of the present invention, which is specifically a blade.

FIG. 1 shows a cutting member according to an embodiment of the present invention, which is a blade. The blade defines a first edge 1, a second edge 2 and a third edge 3, wherein the first edge 1 and the second edge 2 have a first intersection 11, the first edge 1 and the third edge 3 have a second intersection 12, and the second edge 2 and the third edge 3 have a third intersection 13. In this specific implementation, the blade exhibits a triangular configuration.

The blade has a first portion 4 for supporting and a second portion 5 for forming a cutting edge. The first portion 4 extends along the second edge 2 towards the third edge 3 and the second portion 5 extends between the first edge 1 and the first portion 4 towards the third edge 3. There is a third portion 6, i.e., a weld formed by welding between the first portion 4 and the second portion 5, and the third portion 6 connects the first portion 4 and the second portion 5.

The first portion 4 is made of a first metal material which has relatively high toughness, and martensite stainless steel is selected. In a preferred embodiment, the martensitic stainless steel has a carbon content of 0.1~0.7%, and may be selected from standardized martensitic stainless steels of the following brands (Chinese brand/U.S. brand), including but not limited to 2Cr13/420, 3Cr13/420, 4Cr13 and 7Cr17/440, and the like.

The second portion 5 is made of a second metal material which has relatively high hardness/abrasion resistance, and high-speed tool steel or alloy tool steel is selected. In a preferred embodiment, the high-speed tool steel has a carbon content of not less than 0.7% and contains at least one or more of the alloy elements such as W, Cr, Mo, V and Co, and may be selected from standardized high-speed tool steels of the following brands (Chinese brand/U.S. brand), including but not limited to W18Cr4V/T1, W18Cr4V2Co8/T5, W12Cr4V5Co5/T15, W6Mo5Cr4V2/M2, W2Mo9Cr4V2/M7 and W2Mo9Cr4VCo8/M42. In still another preferred embodiment, the alloy tool steel has a carbon content of not less than 0.8%, and may be selected from standardized alloy tool steels of the following brands (Chinese brand/U.S. brand), including but not limited to Cr12Mo1V1/D2, Cr12/D3 and Cr5Mo1V/A2.

Figure 2:
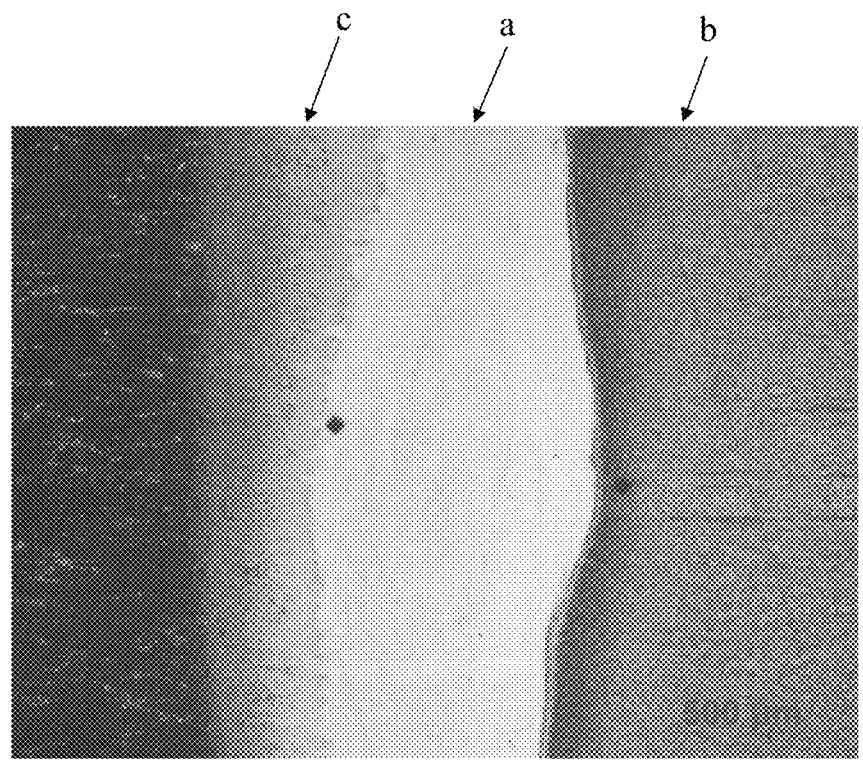
FIG. 2 is a metallographic structure near a third portion of a preferred embodiment of a cutting member of the present invention.

A third portion 6 of the blade is formed when the first metal material and the second metal material are welded for connection. The third portion 6 is a weld between the first portion and the second portion. Observing the metallographic structure of the weld, as shown by "a" in FIG. 2, there is substantially no holes formed, indicating that the welding effect of the weld is good. At the first portion 4 near the third portion 6, as shown by "b" in FIG. 2, the metallographic structure thereat after welding contains martensite, ferrite and carbide structures. At the second portion 5 near the third portion 6, as shown by "c" in FIG. 2, the metallographic structure thereat after welding contains cryptocrystalline martensite and partial carbide structures. The above-described metallographic structures ensure that the tensile strengths of the first portion 4 and the second portion 5 near the third portion 6 are at least comparable to that of the base material. The metallographic structures of the third portion 6, the first portion 4 near the third portion 6, and the second portion 5 near the third portion 6 are substantially free of holes, indicating that the structure strength at the welding site is high and is not easily broken, therefore, it is no more likely to occur that the first portion and the second portion are broken off during use, extending the service life of the blade.

In a preferred embodiment, the ratio of the width of the second portion 5 to the maximum width of the first portion 4 is between 1:15 and 1:3, such as 1:15, 1:10, 1:5 or 1:3. The ratio in this range ensures that the second portion 4 can be welded to the first portion 5 and that the second portion 4 is not too wide to weaken the toughness of the first portion 5, thereby causing the entire blade to be easily broken. This ensures the hardness and abrasion resistance of the cutting edge formed by the second portion and also ensures high toughness of the first portion.

In still another embodiment, the first edge 1 of the blade consists of at least two line segments, including a continuous curve. The curve formed by all the line segments is mathematically continuously differentiable. With such cutting edge curve, in combination with the triangular blade structure, a good cutting effect can be produced.

Figures 3, 4:
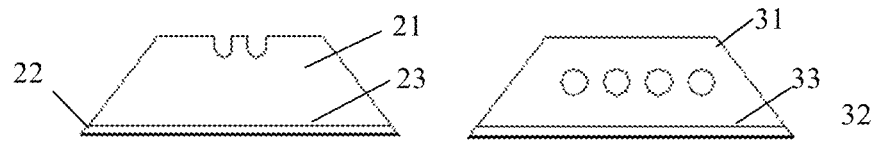
FIG. 3 and FIG. 4 are schematic views of an embodiment of a cutting member of the present invention, which is specifically a blade of a utility knife.
Figure 5:
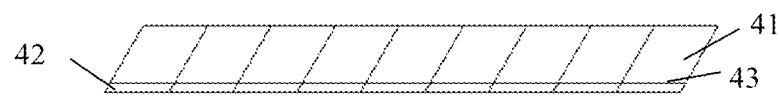
FIG. 5 is a schematic view of another embodiment of a cutting member of the present invention, which is specifically a blade of an art knife.
Figure 6:
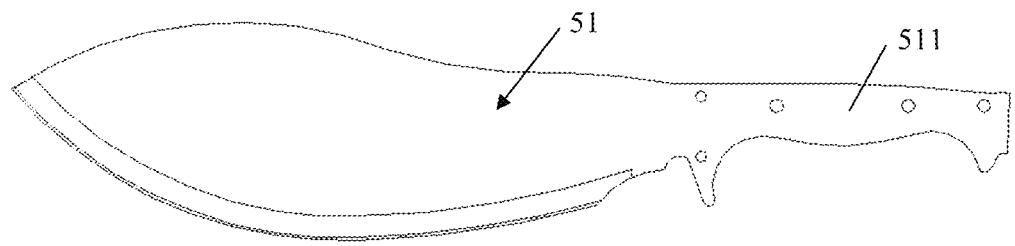
FIG. 6 and FIG. 7 are schematic views of still another embodiment of a cutting member of the present invention, which is specifically a machete.
Figure 7:
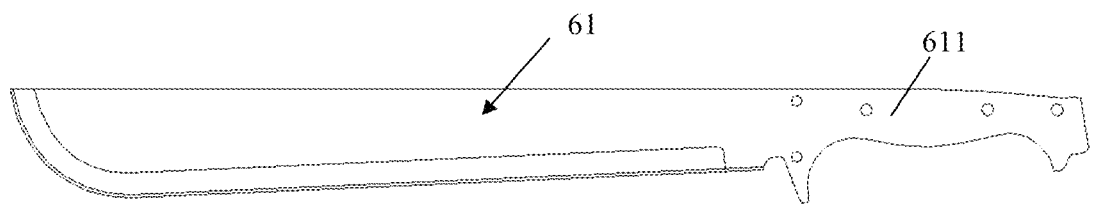
Figure 8:
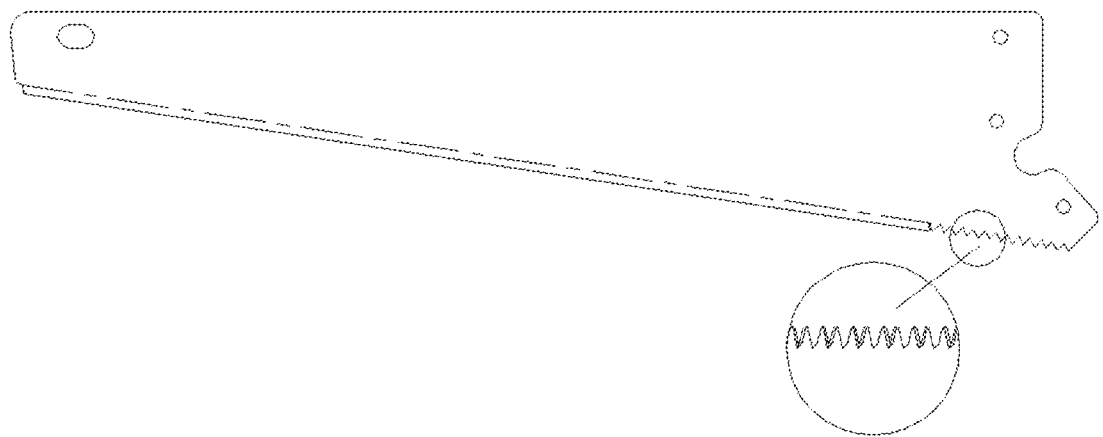
FIG. 8 and FIG. 9 are schematic views of further another embodiment of a cutting member of the present invention, which are specifically a saw blade of a hand saw and a saw blade of a wallboard saw.
Figure 9:
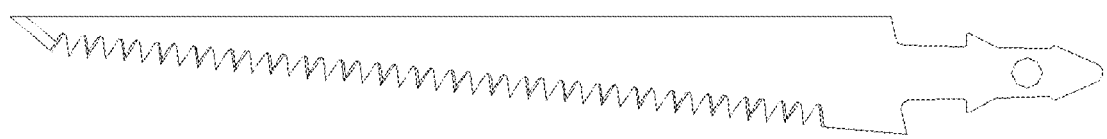

It will be understood by those skilled in the art that the cutting member of the present invention may also have various shapes and configurations, for example, a blade of a utility blade as shown in FIGS. 3 and 4, which has trapezoidal appearance and includes a first portion 21, 31 for supporting, a second portion 22, 32 for forming a cutting edge, and a third portion 23, 33 formed by welding between the first portion and the second portion, and the first portion 21 or 31 has grooves or holes for cooperating with other portions of the utility knife. The cutting member may also be an art knife as shown in FIG. 5, which has a parallelogram shape and includes a first portion 41 for supporting, a second portion 42 for forming a cutting edge, and a third portion 43 formed by welding between the first portion and the second portion. The cutting member may also be a machete as shown in FIGS. 6 and 7, the first portion 51 or 61 thereof has an elongated protruding handle connecting portion 511 and 611, and the material of the handle connecting portion may be the same as or different from the material of the first portion. The cutting member may also be a saw blade of a hand saw or a wallboard saw as shown in FIGS. 8 and 9, and the second portion thereof which forms a cutting edge has a sawtooth-shaped edge formed by grinding or the like. The sawtooth shape may be a commonly used sawtooth shape in the art, such as double grinding tooth or triple grinding tooth. In these different embodiments, the metallographic structures of the material of the first portion, the material of the second portion, the third portion after welding and the nearby portion of the third portion after welding are as described in the foregoing embodiments and will not be described here again.

It will be understood by those skilled in the art that the cutting member of the present invention may also have various other shapes and configurations other than those described above.

Another aspect of the present invention provides a method of manufacturing a cutting member as described above, in a specific embodiment, the manufacturing method includes the steps of: 1) blanking a first metal material and a second metal material, 2) welding with high energy density beam, such as laser, electron beam or ion beam welding, 3) performing heat treatment on the cutting member blank after welding, and 4) grinding the cutting member after heat treatment to form a finished product.

In one embodiment of the manufacturing method of the present invention, the first metal material adopts martensitic stainless steel with a carbon content of 0.1~0.7%, and the second metal material adopts high-speed tool steel with a carbon content of not less than 0.7%.

First, the first metal material and the second metal material are respectively blanked and cut into shapes substantially corresponding to the first portion and the second portion of the finished cutting member. The cutting may be performed using wire cutting or high-speed punch press, and may also be performed using other cutting methods conventionally used in the art. The first metal material after cutting has a relatively flat first side, and the second metal material after cutting has a relatively flat second side.

Then, the first side of the first metal material and the second side of the second metal material after cutting are welded with pulse laser light having a wavelength of 1064 nm and a moving rate of 5~50 mm/s. In another embodiment of the present invention, it is also possible to weld with a continuous laser light having a wavelength of 1070 nm±10 nm and a moving rate of 5~50 mm/s, and the continuous laser light is generated by a rare-earth doped laser. In addition, it is also possible to weld with electron beam and ion beam.

Thereafter, heat treatment is performed on the cutting member blank after welding.

The heat treatment includes 1) temperature raising and holding; 2) quenching; and 3) tempering. Wherein, temperature raising and holding and quenching are performed in a vacuum oven, and the degree of vacuum in the vacuum heating chamber is not greater than 200 Pa before quenching.

The heat treatment is specifically:

1) temperature raising and holding: raising the temperature to 620~680° C. at a rate of 9.5±1° C./min and holding the temperature for 60~90 min; and then raising the temperature to 800~850° C. at a rate of 7±0.5° C./min and holding the temperature for 60~90 min; and then raising the temperature to 1100~1250° C. at a rate of 6±0.5° C./min and holding the temperature for 60~120 min. In a preferred embodiment, raising the temperature to 650° C. at a rate of 9.5° C./min and holding the temperature for 90 min; and then raising the temperature to 800~850° C. at a rate of 7° C./min and holding the temperature for 60~90 min; and then raising the temperature to 1100~1250° C. at a rate of 6° C./min and holding the temperature for 60~120 min;

2) quenching: using the vacuum gas quenching, filling inert gas into the heating chamber so that the pressure of the inert gas in the heating chamber is at least 0.5 bar, and cooling to below 100° C. (which means that the display temperature of the vacuum oven is below 100° C.). In another embodiment, the quenching adopts vacuum oil quenching, and the temperature of the vacuum quench oil used is in the range of 50~80° C.; and 3) tempering: air-cooling the cutting member blank after quenching to room temperature, and then raising the temperature to 500~560° C., holding the temperature for 2 hours, and then repeating such steps twice, that is, the tempering is performed three times in total.

Finally, the cutting member blank after heat treatment is grinded in size and shape. The grinding may be performed using the methods conventionally used in the art, for example, by means of a grinder.

In another embodiment of the manufacturing method of the present invention, the first metal material adopts martensitic stainless steel having a carbon content of 0.1~0.7%, and the second metal material adopts alloy tool steel having a carbon content of not less than 0.8%.

Blanking, welding, the steps of temperature raising and quenching in the heat treatment, and the final grinding step are as described in the previously specific implementation of the manufacturing method and will not be described again.

The specific steps of tempering in the process of the heat treatment is: air-cooling the cutting member blank after quenching to room temperature, and then raising the temperature to 180~260° C., holding the temperature for 2 hours, and then repeating such steps once, that is, the tempering is performed twice in total.

Furthermore, in still another embodiment of the manufacturing method, the heat treatment of the cutting member blank after welding may not be performed under vacuum.

With the manufacturing method of the above-described specific implementations or embodiments, the third portion is obtained after welding, and the metallographic structure thereof is substantially free of holes (as shown by "a" in FIG. 2), which indicates that with the welding manner in the specific implementations, the effect of welded connection is good, and the third portion formed by welding is not easily broken. The first portion near the third portion after welding forms metallographic structure containing martensite, ferrite and carbide structures, which improves the tensile strength thereat so that it is at least not lower than the original tensile strength of the first metal material used in the first portion. The second portion near the third portion after welding forms metallographic structure containing cryptocrystalline martensite and partial carbide structures, which improves the tensile strength thereat so that it is at least not lower than the original tensile strength of the second metal material used in the second portion.

After heat treatment, the first portion has a hardness of 36-54 HRC, and such hardness imparts better toughness to the first portion, so that the cutting member is not easily broken. The second portion has a hardness of 58-72 RHC, which imparts good abrasion resistance to the second portion, making the service life of the cutting edge longer.

A further aspect of the present invention provides a cutting tool including the cutting member described above. The cutting tool can be a fruit knife, a utility knife, a folding knife, an art knife, a single knife, a hand saw, a wallboard saw or a sweep saw.

The single knife formed with a blade manufactured using the method of the present invention, when compared to the existing single knife, has sharpness and durability as following:

TABLE 1

| No. | Item | Sharpness (mm) | Durability (mm) |
|---|---|---|---|
| 1 | the single knife with a cutting member manufactured according to the manufacturing method of the present invention | 35.8 | 303.6 |
| 2 | the existing single knife | 29.6 | 94.1 |

It can thus be seen that the durability of the single knife with a cutting member according to the embodiment of the present invention has increased several times than that of the existing single knife.

The preferred specific embodiments of the present invention have been described in detail above. It is to be understood that numerous modifications and variations can be made by those ordinary skilled in the art in accordance with the concepts of the present invention without any inventive effort. Hence, the technical solutions that can be derived by those skilled in the art according to the concepts of the present invention on the basis of the prior art through logical analysis, reasoning and limited experiments should be within the scope of protection defined by the claims.

The invention claimed is:

1. A method of manufacturing a cutting member, the manufacturing method comprising:
    step 1: cutting a first metal material to form a first portion of the cutting member, wherein the first portion is for supporting the cutting member and is a triangular shape, the first metal material being martensitic stainless steel having a carbon content of 0.1~0.7%;
    step 2: cutting a second metal material to form a second portion of the cutting member, wherein a first edge of the second portion, which is along a length direction of the cutting member, consists of at least two line segments, and one of the at least two line segments is continuous, and a curve formed by all the line segments being mathematically continuously differentiable, the second metal material is high-speed tool steel having a carbon content of not less than 0.7% or alloy tool steel having a carbon content of not less than 0.8%;
    step 3: welding the first portion and the second portion with one of laser, electron beam or ion beam and producing a cutting member blank; and
    step 4: performing heat treatment on the cutting member blank, the heat treatment comprising (a) raising and holding the temperature of the cutting member blank in stages, (b) quenching the cutting member blank after raising and holding the temperature of the cutting member blank in stages, and (c) tempering the cutting member plural times after quenching the cutting member blank,
    wherein the raising and holding the temperature of the cutting member blank in stages comprises:
    raising the cutting member blank to a first temperature at a first rate and holding the cutting member blank at the first temperature for a first predetermined time period, the first rate being 9.5±1° C./min, the first temperature being 620~680° C., and the first predetermined time period being 60~90 min;
    raising the cutting member blank from the first temperature to a second temperature at a second rate lower than the first rate and holding the cutting member blank at the second temperature for a second predetermined time period, the second rate being 7±0.5° C./min, the second temperature being 800~850° C., and the second predetermined time period being 60~90 min; and
    raising the cutting member blank from the second temperature to a third temperature at a third rate not higher than the second rate and holding the cutting member blank at the third temperature for a third predetermined time period, the third rate being 6±0.5° C./min, the third temperature being 1100~1250° C., and the third predetermined time period being 60~120 min.

2. The method of manufacturing a cutting member according to claim 1, wherein the raising and holding the temperature of the cutting member blank in stages is performed under vacuum pressure of not more than 200 Pa before the quenching of the cutting member blank.

3. The method of manufacturing a cutting member according to claim 1, wherein the quenching is vacuum gas quenching in a heating chamber, the pressure of the inert gas in the heating chamber is at least 0.5 bar, and the temperature in the heating chamber is reduced to below 100° C.

4. The method of manufacturing a cutting member according to claim 1, wherein the quenching is vacuum oil quenching, and the temperature of the vacuum quenching oil used is in the range of 50~80° C.

5. The method of manufacturing a cutting member according to claim 1, wherein:
the second metal material is a high-speed tool steel having a carbon content of not less than 0.7%, and
tempering comprises, after the quenching, raising the cutting member blank to a fourth temperature and holding the cutting member blank at the fourth temperature for a fourth predetermined time period.

6. The method of manufacturing a cutting member according to claim 5, wherein:
the fourth temperature is 500~560° C., the fourth predetermined time period is 2 hours,
the raising of the cutting member blank to the fourth temperature and holding the cutting member blank at the fourth temperature for the fourth predetermined time period is performed three times, and
the cutting member blank is air-cooled to a room temperature before the raising of the cutting member blank to the fourth temperature.

7. The method of manufacturing a cutting member according to claim 1, wherein:
the second metal material is an alloy tool steel having a carbon content of not less than 0.8%, and
the step of tempering comprises, after the quenching, raising the cutting member blank to a fifth temperature and holding the cutting member blank at the fifth temperature for a fifth predetermined time period.

8. The method of manufacturing a cutting member according to claim 7, wherein:
the fifth temperature is 180~260° C., the fifth predetermined time period is 2 hours,
the raising of the cutting member blank to the fifth temperature and holding the cutting member blank at the fifth temperature for the fifth predetermined time period is performed twice, and
the cutting member blank is air-cooled to a room temperature before every raising of the cutting member blank to the fifth temperature.

* * * * *